United States Patent
Elferich

(10) Patent No.: US 10,070,487 B2
(45) Date of Patent: Sep. 4, 2018

(54) LINEAR POST-REGULATOR

(71) Applicant: PHILIPS LIGHTING HOLDING B.V., Eindhoven (NL)

(72) Inventor: Reinhold Elferich, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/522,226

(22) PCT Filed: Oct. 27, 2015

(86) PCT No.: PCT/EP2015/074793
§ 371 (c)(1),
(2) Date: Apr. 26, 2017

(87) PCT Pub. No.: WO2016/071146
PCT Pub. Date: May 12, 2016

(65) Prior Publication Data
US 2017/0325302 A1    Nov. 9, 2017

(30) Foreign Application Priority Data
Nov. 3, 2014 (EP) .................................... 14191413

(51) Int. Cl.
*H05B 37/02* (2006.01)
*H05B 33/08* (2006.01)

(52) U.S. Cl.
CPC ..... *H05B 33/0812* (2013.01); *H05B 33/0848* (2013.01); *H05B 37/0272* (2013.01)

(58) Field of Classification Search
CPC ............ H05B 33/0812; H05B 33/0815; H05B 33/0836; H05B 33/0848; H05B 33/0851
(Continued)

(56) References Cited

U.S. PATENT DOCUMENTS 6,734,639 B2 * 5/2004 Chang ................ H05B 33/0818
315/224
7,276,861 B1 * 10/2007 Shteynberg ........... H02M 3/157
315/224
(Continued)

FOREIGN PATENT DOCUMENTS

WO    2011102799 A1    8/2011

OTHER PUBLICATIONS

Allegro Microsystems, LLC, "Automotive High Current LED Controller".
(Continued)

*Primary Examiner* — Tung X Le

(57) ABSTRACT

The invention describes a linear post-regulator (1) realized for use in an LED lighting arrangement (2), which linear post-regulator (1) comprises a control loop cascade (L1, L2, L3) realized for connection between a terminal of an LED lighting load (20) and a power converter (21) of the LED lighting arrangement (2); a transistor (Q) realized to regulate an LED current ($I_{LED}$) through the LED lighting load (20); a first input (11) for connection to a reference current input ($I_{ref}$); a second input (12) for connection to a performance parameter input ($V_{ref}$, $\Delta Iref$); and an output for connecting a power control output (Pctr) of the linear post-regulator (1) to the power converter (21); wherein the control loop cascade (L1, L2, L3) comprises at least two interconnected control loops (L1, L2, L3) to regulate the LED current ($I_{LED}$) on the basis of the reference current input (Iref) and to regulate a further performance parameter of the LED lighting arrangement (2) on the basis of the performance parameter input ($V_{ref}$, $\Delta Iref$). The invention also describes an LED lighting arrangement (2), and a method of post-regulating the current of an LED lighting load (20) of an LED lighting arrangement (2).

13 Claims, 8 Drawing Sheets

(58) Field of Classification Search
USPC .......................................... 315/291, 294, 307
See application file for complete search history.

(56) References Cited

U.S. PATENT DOCUMENTS

| | | | |
|---|---|---|---|
| 7,659,672 B2 | 2/2010 | Yang | |
| 7,804,256 B2* | 9/2010 | Melanson | H05B 33/0815 |
| | | | 315/224 |
| 8,674,621 B2 | 3/2014 | Ge | |
| 2009/0167200 A1* | 7/2009 | Brokaw | H02M 1/36 |
| | | | 315/224 |
| 2009/0187925 A1 | 7/2009 | Hu et al. | |
| 2010/0237786 A1 | 9/2010 | Hendrik et al. | |
| 2012/0206064 A1 | 8/2012 | Archenhold et al. | |
| 2013/0119868 A1* | 5/2013 | Saxena | H05B 33/0815 |
| | | | 315/122 |
| 2015/0008826 A1* | 1/2015 | Wu | H05B 33/0803 |
| | | | 315/127 |
| 2015/0312989 A1* | 10/2015 | Wee | H05B 33/0854 |
| | | | 315/113 |
| 2017/0288557 A1* | 10/2017 | Fang | H02M 3/33576 |

OTHER PUBLICATIONS

Chen, Wu et al, "A dimmable light-emitting diode (LED) driver with mag-amp postregulators for multistring applications"; IEEE Transactions on Power Electronics, 2011, v. 26, No. 6, p. 1714-1722, 2011.

\* cited by examiner

LINEAR POST-REGULATOR

CROSS-REFERENCE TO PRIOR APPLICATIONS

This application is the U.S. National Phase application under 35 U.S.C. § 371 of International Application No. PCT/EP2015/074793, filed on Oct. 27, 2015 which claims the benefit of European Patent Application No. 14191413.5, filed on Nov. 3, 2014. These applications are hereby incorporated by reference herein.

FIELD OF THE INVENTION

The invention describes a linear post-regulator, an LED lighting arrangement, and a method of post-regulating the current of an LED lighting load of an LED lighting arrangement.

BACKGROUND OF THE INVENTION

LED lighting is becoming more and more popular as manufacturing costs are reduced to offer affordable LED lamps for many fixture types. In one widespread type of LED lighting device for indoor or outdoor lighting, a rectifier is used to rectify a mains input, and an LED driver delivers the desired voltage and current levels to an LED arrangement comprising one or more strings of LEDs. For cost reasons, many LED drivers use a single-stage power conversion architecture, even if the driver requires a high power factor. However, this can lead to a high LED ripple current. The ripple current might be compensated to some extent by a storage capacitor connected in parallel to the LEDs, but cannot be corrected entirely due to the limited dynamic resistance of the LEDs. Due to the increasingly efficient LED technology, that dynamic resistance also tends to decrease further in time. The pronounced ripple current can also adversely affect the luminous efficiency of the LEDs.

In a known approach to correcting this problem, a linear post-regulator is connected at the output of the LED arrangement and serves to control the LED current while the voltage supply to the LED arrangement is controlled by the power converter. Existing linear post-regulators can be relatively inexpensive, but are generally associated with an increase in losses. A linear post-regulator generally comprises a transistor that acts as a controllable resistance controlling the current through the LEDs. Some power is therefore dissipated by this controllable resistance. To cope with the resulting heat, additional or larger heat sinks are required, adding to the overall cost of a lighting application. Another disadvantage of the known types of linear post-regulator is that the level of flicker on the light output can increase, since the storage capacitor can degrade down to 50% of its initial value during the lifetime of such a lighting arrangement. The flicker in such a system depends to a large extent on the LEDs' dynamic resistance. Particularly, standalone LED drivers will have to cope with a range of LED types and thus a range of dynamic resistances.

It is difficult and/or costly to reduce post-regulator losses. Some ways of addressing the problem are to improve thermal management by using a larger heatsink, as already mentioned, however this may unfavourably increase the overall size of the product and adds to the overall costs. Alternatively, a switched-mode converter may be used as the second power stage, which can achieve an almost negligible flicker but which is significantly more expensive and bulky and also adds losses. In another approach, a larger storage capacitor is used to avoid the need for a post-regulator; however the physical size of a capacitor increases with its value, and the cost increases also. When no corrective measures are taken, the lamp may eventually exhibit noticeable flicker.

Therefore, it is an object of the invention to provide an improved linear post-regulation that avoids the problems outlined above.

SUMMARY OF THE INVENTION

The object of the invention is achieved by the linear post-regulator of claim 1; by the LED lighting arrangement of claim 10; and by the method of claim 13 of post-regulating the current of an LED lighting load.

According to the invention, the linear post-regulator is realized for use in an LED lighting arrangement, and comprises a control loop cascade realized for connection between a terminal of an LED lighting load and a power converter; a transistor realized to regulate LED current through the LED lighting load; a first input for connection to a reference current; a second input for connection to a performance parameter; and an output for connecting a power control output of the linear post-regulator to the power converter; wherein the control loop cascade comprises at least two interconnected control loops that act together to regulate the LED current on the basis of the reference current input and to regulate a further performance parameter of the LED lighting arrangement on the basis of the performance parameter input.

The performance parameter which can be controlled by the post-regulator according to the invention can be the post-regulator loss or the flicker of the light output of the LED arrangement. The linear post-regulator according to the invention can advantageously reduce the losses of the post-regulation to a minimum, while at the same time allowing an adjustable compromise between capacitor size and flicker on the light output. For example, the linear post-regulator according to the invention can achieve essentially constant post-regulation loss or essentially constant flicker over the lifetime of the LED lighting arrangement. An advantage of the linear post-regulator according to the invention is that a minimum loss operation and/or a minimum current ripple operation is made possible while permitting the use of a smaller storage capacitor. The linear post regulator according to the invention can be realized using favourably inexpensive analogue components. The physical size of the linear post-regulator according to the invention can also be favourably small, so that it can be used in a variety of applications in which a lighting fixture housing has only a limited available space for additional circuitry, for example when the post-regulator according to the invention is used to retro-fit an existing product series. The terminal of the LED lighting load can be its cathode terminal (e.g. the cathode of the last LED in a string) or its anode terminal (e.g. the anode of the first LED in a string). The post-regulator according to the invention is preferably connected between the cathode of the LED lighting load and a node or input terminal of the power converter. For example, the last LED of an LED string can be connected to a circuit node of the post-regulator, and the power control output of the post-regulator can be connected to an appropriate node of the power converter.

According to the invention, the LED lighting arrangement comprises a single-stage power converter for connection to a power supply such as a mains power supply; an LED lighting load comprising a number of LEDs; and a linear post-regulator according to the invention, connected between a terminal of the LED lighting load and a terminal of the power converter; and an input means for providing a reference current and a performance parameter to the linear post-regulator. The performance parameter can be a reference voltage or a reference current ripple, depending on the desired effect.

In an LED lighting arrangement according to the invention, the first and second inputs can comprise a local signal source, i.e. local to the lighting arrangement. For example, the reference current and/or the performance parameter can be derived from one or more reference voltages, which can be fixed according to design, or can be preset, for example during a configuration stage. Alternatively or in addition, a reference current and/or performance parameter can be transmitted to the lighting arrangement as a signal, for example a wireless signal in the case of an LED lighting arrangement that is realised to be part of a wireless network.

An advantage of the LED lighting arrangement is that it can implement a cheap and compact LED driver. The linear post-regulator can be configured to ensure either constant post-regulation loss or constant flicker over the lifetime of the lighting arrangement, independently of the dynamic resistance of the LED load connected to the driver.

According to the invention, the method of post-regulating the current of an LED lighting load comprises the steps of providing a post-regulator comprising a control loop cascade of at least two interconnected control loops for connection between a terminal of the LED lighting load and a node of a power converter, and a transistor for controlling an LED current through the LED lighting load; providing to the post-regulator a first input for connection to a reference current; providing to the post-regulator a second input for connection to a reference voltage or a reference current ripple; and applying the control loop cascade to regulate the LED current on the basis of the reference current. To this end, the post-regulator also provides a power control output signal to the power converter.

An advantage of the method according to the invention is that available information regarding current and voltage can be used in a favourably straightforward manner to generate specific control signals that regulate the LED current as well as one or more further performance parameters in order to achieve a desired mode of control.

The dependent claims and the following description disclose particularly advantageous embodiments and features of the invention. Features of the embodiments may be combined as appropriate. Features described in the context of one claim category can apply equally to another claim category.

In the following, but without restricting the invention in any way, it may be assumed that the LED lighting load comprises at least one string of LEDs. For example, the LED lighting load may comprise an LED string with a forward voltage of 100 V and a total rated power of 25 W, and can implement a low-cost driver such as a relatively simple switched-mode power converter. Again without restricting the invention in any way, it may be assumed in the following that the power converter is a switched-mode power supply configured to obtain a high power factor.

As indicated above, the linear post-regulator according to the invention can be used in one of two modes, depending on the desired type of correction or optimisation to be performed. In one preferred embodiment of the invention, regulation losses of the post-regulator are controlled on the basis of a feedback signal from a control loop of the control loop cascade. In such an embodiment, the performance parameter comprises a reference voltage input that corresponds to a "desired loss" or "reference loss", and the control loop cascade is realized to provide a feedback signal or power control signal to the power converter to cause it to adjust its output voltage accordingly. The "power control signal" may also be referred to as a "power correction signal" in the following. In this embodiment, the lighting arrangement is operated in a "constant loss" control mode.

In an alternative preferred embodiment of the invention, the level of flicker on the light output of the LED lighting load is controlled on the basis of a feedback signal from a control loop of the control loop cascade. In such an embodiment, the performance parameter comprises a reference current ripple that represents a "desired current ripple" or "desired flicker", and the control loop cascade is realized to provide a feedback signal or power correction signal to the power converter to cause it to adjust the current ripple on the LED current accordingly. In such an embodiment, the lighting arrangement is operated in a "constant flicker" mode. A decrease of ripple or flicker on the post-regulated LED current can also lead to a favourable increase in light output, and can thereby compensate for any increase in post-regulator losses.

In any case, the control loop cascade comprises a control loop that regulates the current through the LED arrangement. To this end, the linear post regulator comprises a first control loop realized to provide a control signal to the transistor. The polarity and size of the control signal depends on the type of transistor that is used to allow current to flow through the LEDs. Preferably, the transistor comprises a field-effect transistor (FET) such as an n-channel depletion-mode MOSFET. In the linear post-regulator according to the invention, the transistor is not used as an "on/off" switch but instead is controlled to operate either in its linear mode (as a controllable resistance) or in its saturated/fully conductive mode. In an alternative embodiment that implements the transistor using a BJT, a control current is applied to the base of the BJT. Preferably, the first control loop is provided with a measurement of the LED current, as well as a signal relating to the reference current input. Using a suitable internal feedback arrangement, the first control loop can continuously adjust the control signal for the transistor essentially immediately in response to the instantaneous situation, so that current through the LEDs can be continually regulated as required.

In a preferred embodiment of the invention, the linear post-regulator comprises a second control loop realized to generate a first loop reference current on the basis of the reference current and the measured LED current. This will be explained in more detail in the description of the drawings.

In a further preferred embodiment of the invention, the control loop cascade of the linear post-regulator comprises a control loop realized to provide a control signal to the power converter controlling its power on the basis of the performance parameter and the voltage across the post-regulator, whereby the control signal is used to obtain the desired correction of the performance parameter as described above, depending on whether the post-regulator is realized to achieve "constant loss" operation or "constant flicker" operation of the lighting arrangement. Since the first and second control loops act to control the transistor and thereby to regulate the LED current level, the voltage across the post-regulator will change according to the LED current. In a "constant loss" mode of operation, this voltage, along with the corresponding performance parameter input, is then used by a third control loop to generate the power correction signal to the power converter. In a "constant flicker" mode of operation, the measured current along with the reference current input is used to generate the power correction signal to the power converter.

The control loops of the linear post-regulator according to the invention may be realized in any suitable way. Preferably, a control loop comprises an arrangement of analogue components and a number of operational amplifiers.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
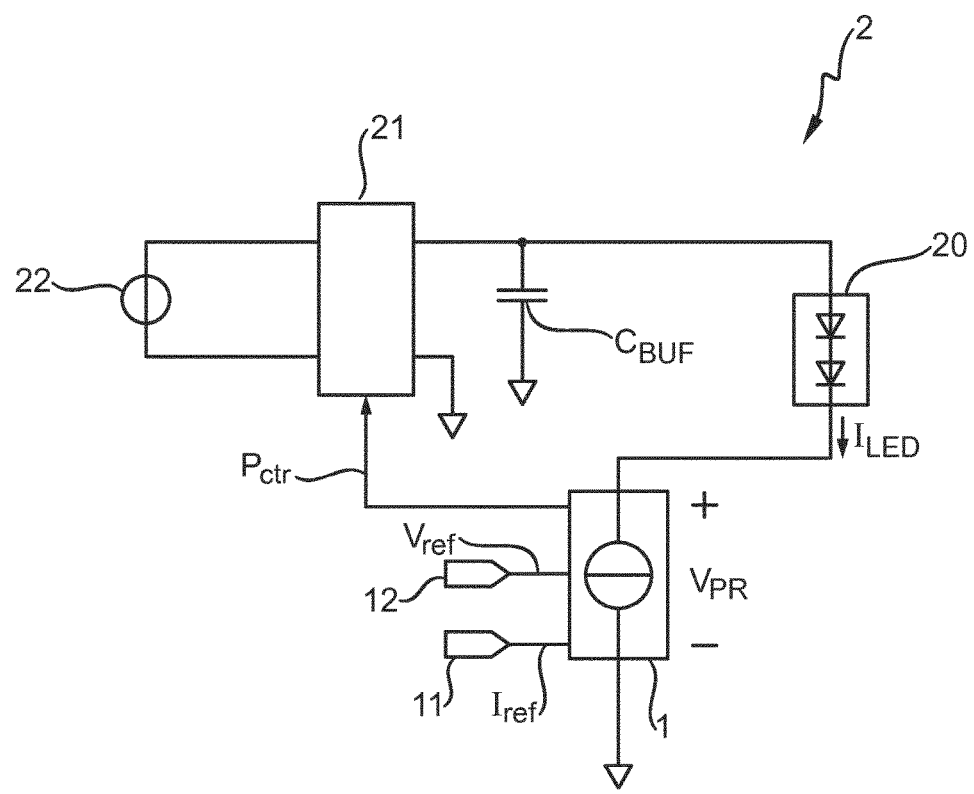
FIG. 1 shows simplified schematic representation of a first embodiment of an LED lighting arrangement according to the invention.

FIG. 1 shows a simplified schematic representation of an LED lighting arrangement 2 according to the invention. A power supply 22 delivers a rectified signal to a single-stage high power-factor (HPF) front-end switched-mode converter 21. A storage capacitor or buffer capacitor $C_{BUF}$ is connected across the outputs of the converter 21 and is arranged in parallel with a series arrangement comprising a lighting load 20 and a post-regulator 1 according to the invention. The post-regulator 1 according to the invention is realised for connection between a terminal cathode of the LED lighting load 20, and a terminal of the converter 21. The voltage $V_{PR}$ across the post-regulator 1 is indicated. The lighting load comprises an LED arrangement 20 as described above. The LED lighting arrangement 2 comprises the linear post-regulator 1 according to the invention, comprising a number of cascaded control loops to control the average LED current $I_{LED}$ and also to reduce the post-regulator losses. To this end, reference signals $V_{ref}$, $I_{ref}$ are supplied to the linear post-regulator 1, which in turn generates a power correction signal $P_{ctr}$ to the HPF converter 21. FIG. 1 shows that the post-regulator 1 receives two setpoints $V_{ref}$, $I_{ref}$ or reference signals $V_{ref}$, $I_{ref}$ and generates the control signal $P_{ctr}$, which is fed into the converter 21 to achieve the desired power conversion. For example, if the converter 21 is a buck type of switched-mode power converter 21, the power correction signal $P_{ctr}$ can specify the input peak current threshold.

An input means 11, 12 for providing the reference signals $V_{ref}$, $I_{ref}$ can comprise a local signal source, i.e. local to the lighting arrangement 2. For example, the reference current input $I_{ref}$ and/or the performance parameter input $V_{ref}$ can be derived from one or more reference voltages, which can have been set at the design stage, or which can have been preset during a configuration procedure. As already described, if the LED lighting arrangement 2 is realised to be part of a wireless network, the reference signals $V_{ref}$, $I_{ref}$ can be transmitted to the lighting arrangement 2 as a wireless signal.

Figure 2:
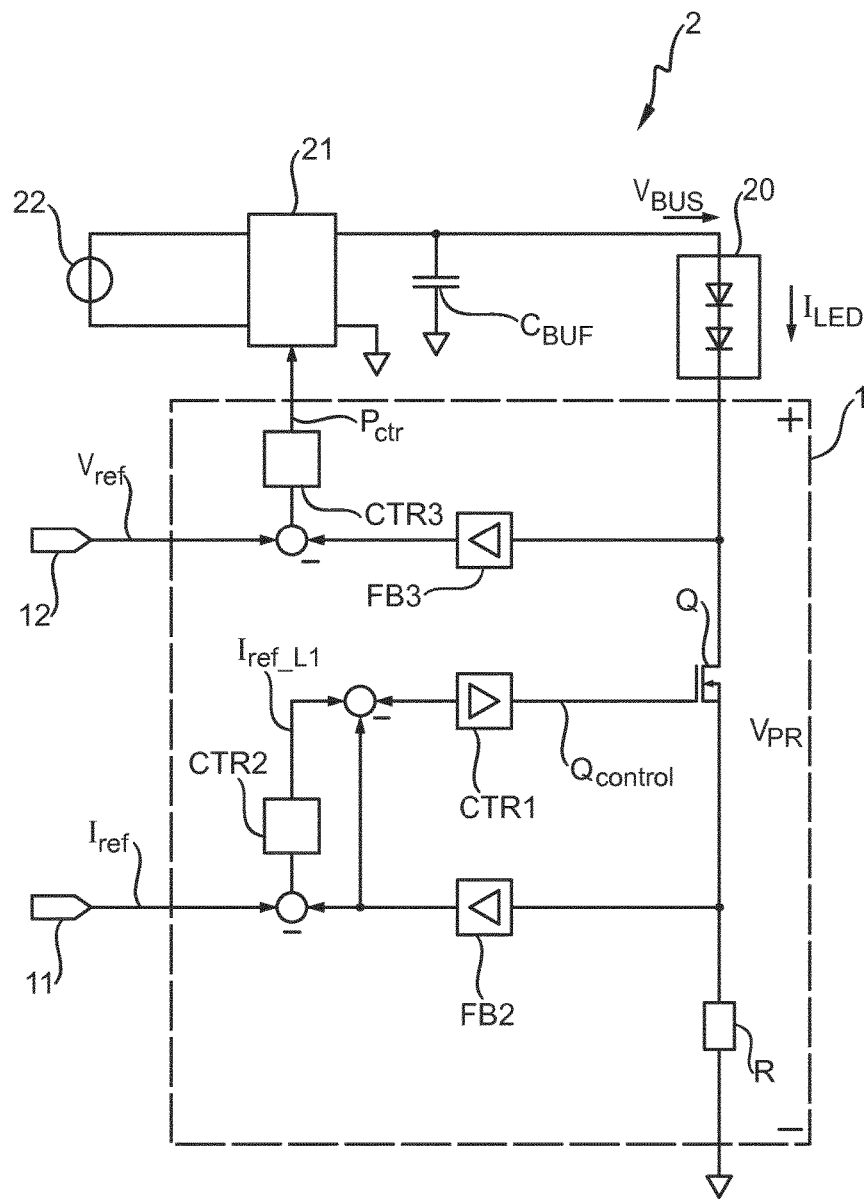
FIG. 2 shows a first elaborated schematic representation of the LED lighting arrangement of FIG. 1.

FIG. 2 shows a possible implementation of the linear post regulator 1 in the lighting arrangement 2 of FIG. 1, showing how the control loops of the linear post-regulator 1 may be realized for a "constant loss" mode of operation. Here, a semiconductor transistor Q is used to regulate current flow through the LED lighting load. The voltage $V_{PR}$ across the post-regulator 1 is indicated. In this embodiment, the transistor Q comprises an n-channel depletion-type MOSFET that may be controlled by applying a suitable voltage at the gate terminal so that the transistor Q operates either in its linear mode (i.e. as a controllable resistance) or in its saturated/fully conductive mode. In a first or "inner" loop, the LED current $I_{LED}$ is controlled by a first controller CTRL to a level specified by a reference signal $I_{ref\_L1}$ during a "high interval" phase $T_{HI}$ as will be explained with the aid of FIG. 5A. An outer control loop makes use of a current feedback FB2 and the controller CTR2 to ensure that the average current requirement is met as specified by the set point $I_{ref}$, and provides the reference signal $I_{ref\_L1}$ to the inner loop. A third loop comprises a voltage feedback FB3 and a controller CTR3 that involve the power converter 21 to control the total converted power to achieve the desired post-regulator losses as specified by the setpoint or performance parameter $V_{ref}$. The three feedback loops perform together to control the LED current $I_{LED}$ on the basis of the gate voltage of the MOSFET Q, and to control the bus voltage $V_{bus}$ on the basis of the power correction signal $P_{CTR}$ applied to the front-end 21.

Figure 3:
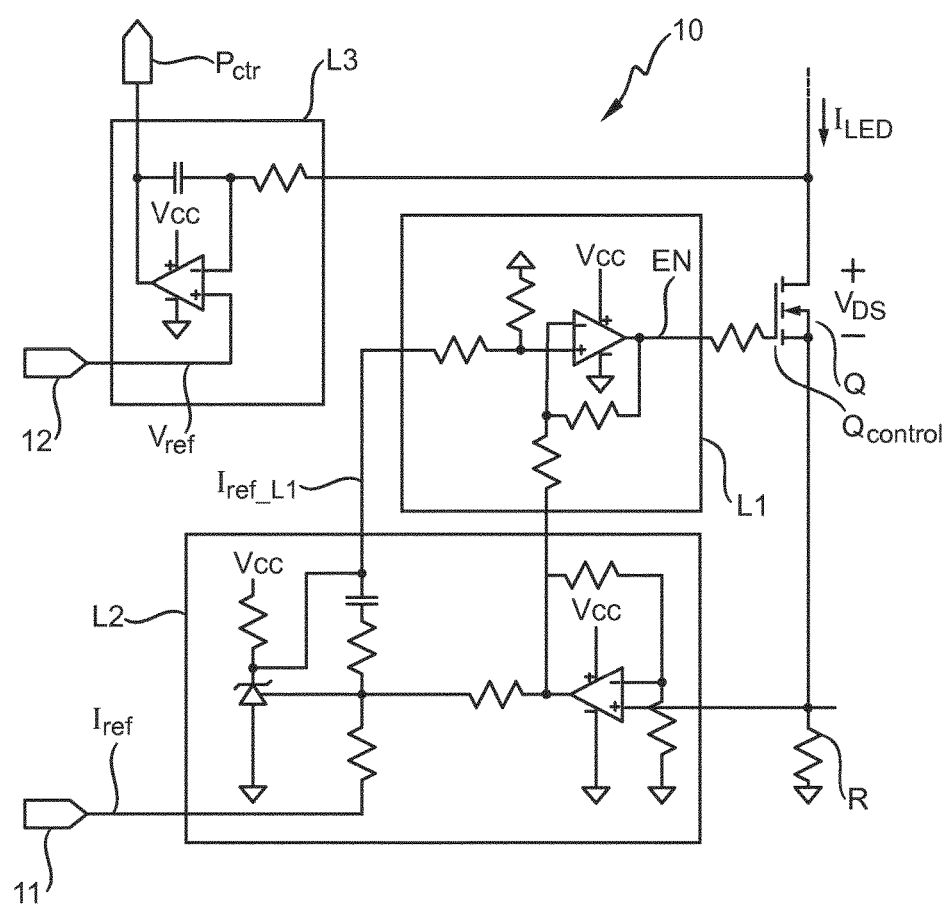
FIG. 3 shows a first embodiment of the linear post-regulator according to the invention.

FIG. 3 shows a possible implementation of the control loops L1, L2, L3 in an embodiment of the linear post-regulator 1 according to the invention. Here, controller units can be realised using operational amplifiers and small signal passive components. Electrical connections to an internal supply voltage are indicated in the usual manner by the "Vcc" tags. The linear post-regulator 1 can be used in a lighting circuit by connecting the node at the upper right of the diagram to the last cathode of an LED string, and by connecting the power correction signal $P_{ctr}$ to a corresponding input of a front-end power converter 21. The diagram shows how the first and second control loops L1, L2 can be implemented. Here also the control signal $Q_{control}$ controls the current $I_{LED}$ through the LED arrangement, which in turn influences the voltage $V_{PR}$ across the post-regulator and the voltage drop $V_{DS}$ across the transistor Q. This in turn influences the value of the first loop reference current $I_{ref\_L1}$, etc. The first and second control loops L1, L2 are therefore also connected to the third control loop L3 in the control loop cascade, since the voltage $V_{PR}$ across the post-regulator 1 is used to adjust the power correction signal $P_{ctr}$ that is output by the third control loop L3, but this voltage is also influenced by the control signal $Q_{control}$ output generated by the first control loop L1 in cooperation with the second control loop L2.

Figure 4:
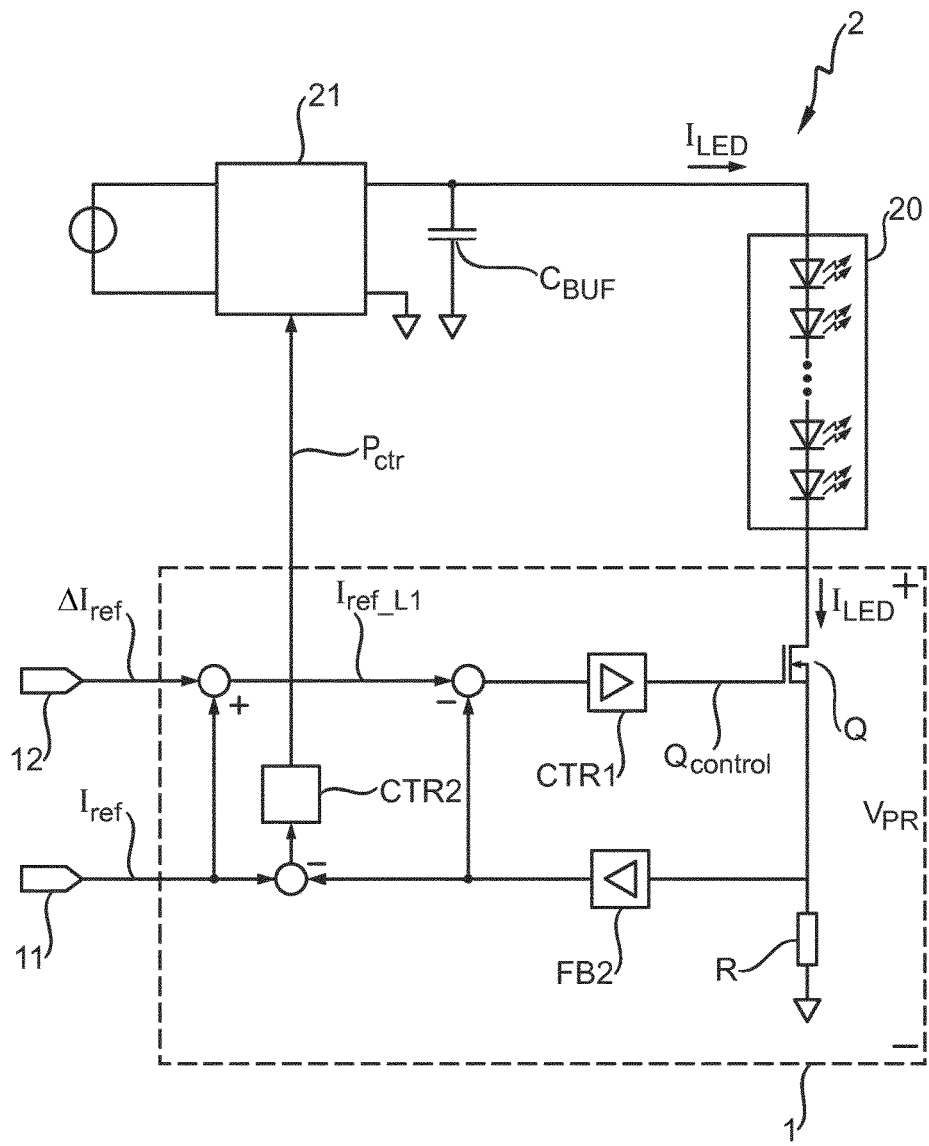
FIG. 4 shows a second elaborated schematic representation of the LED lighting arrangement of FIG. 1.

FIG. 4 shows a simplified schematic representation of another LED driver arrangement 2 with a different embodiment of the linear post-regulator 1 according to the invention, using two control loops L1, L2. The setup is largely the same as in FIG. 2, for example the LED current $I_{LED}$ is controlled by a first controller CTR1 of a first control loop to a level specified by a reference signal $I_{ref\_L1}$ in a first or "inner" loop L1. In this embodiment, the performance parameter comprises a current ripple setpoint $\Delta I_{ref}$ or "flicker setpoint", which specifies the maximum current ripple amplitude that is to be tolerated on the LED current $I_{LED}$. Since flicker is directly related to current ripple, the current ripple setpoint $\Delta I_{ref}$ may also be referred to as a "desired flicker". The reference signal $I_{ref\_L1}$ is obtained by adding the desired ripple $\Delta I_{ref}$ to the reference input $I_{ref}$. This embodiment achieves an explicit control of the current ripple by a closed-loop control of both the average current (specified by the reference input $I_{ref}$) and the current ripple amplitude $\Delta I_{ref}$ (the relationship between average LED current $I_{ref}$, the reference signal $I_{ref\_L1}$ and the current ripple amplitude $\Delta I_{ref}$ will be illustrated in FIG. 5B). The reference input $I_{ref}$ may be controlled via the power converter (e.g. if the power converter 21 is a buck-type converter, either its duty cycle or the input peak current can be used as manipulating value), and the power correction signal $P_{CTR}$ is output by a controller CTR2 of a second control loop. In this realization, the lighting arrangement 2 can be driven to keep the flicker index at an essentially constant desired level. The advantage of this type of control is that the effects of the degradation of the buffer capacitor $C_{BUF}$ over its lifetime can be counteracted.

In an alternative embodiment, current ripple amplitude $\Delta I_{ref}$ can be generated by multiplying the reference average current $I_{ref}$ with a factor that is greater than unity. For example, multiplying by a factor of 1.15 would mean a ripple current with peak current is 15% higher than the average current. This type of control might be preferable if the average current changes due to a reconfiguration of the system, or if the lighting arrangement is to be used in a dimmed mode of operation. In case of a dimmable lamp, the multiplication factor can also be made a function of the average current; so that the multiplication factor becomes smaller when the lamp is dimmed.

Figure 5A:
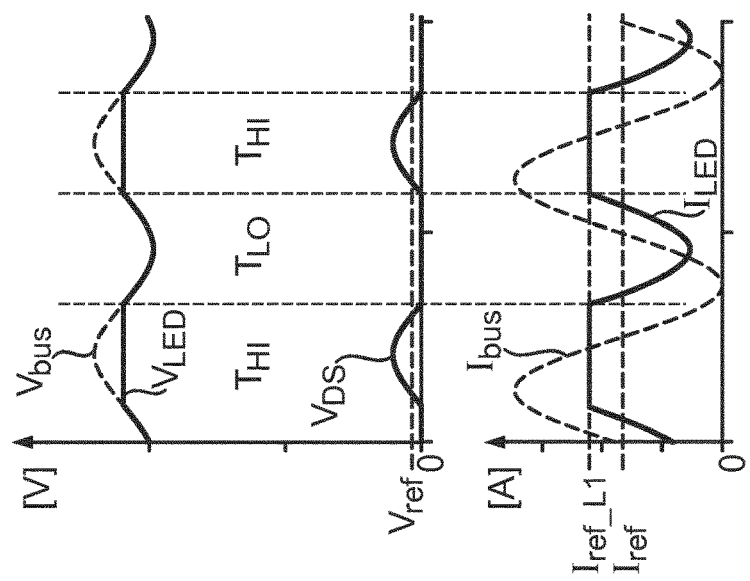
FIG. 5A shows exemplary waveforms for an LED lighting arrangement according to the invention during a "constant loss" mode of operation.
Figure 5A:
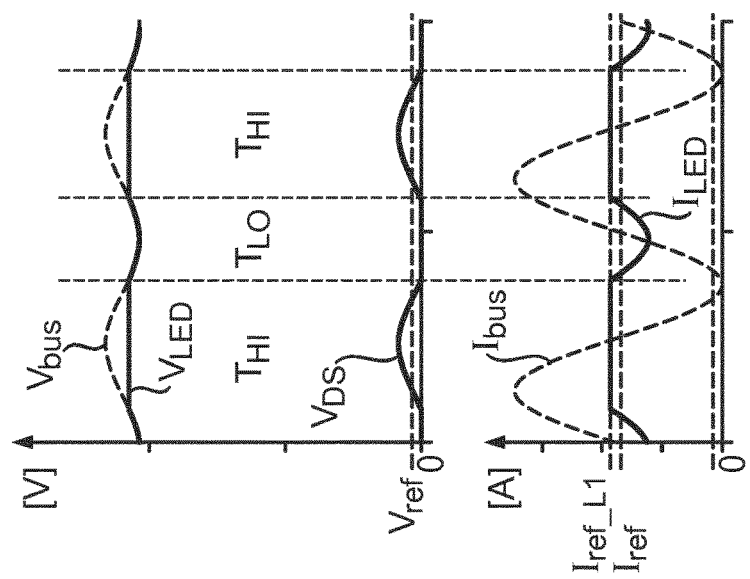
Figure 5B:
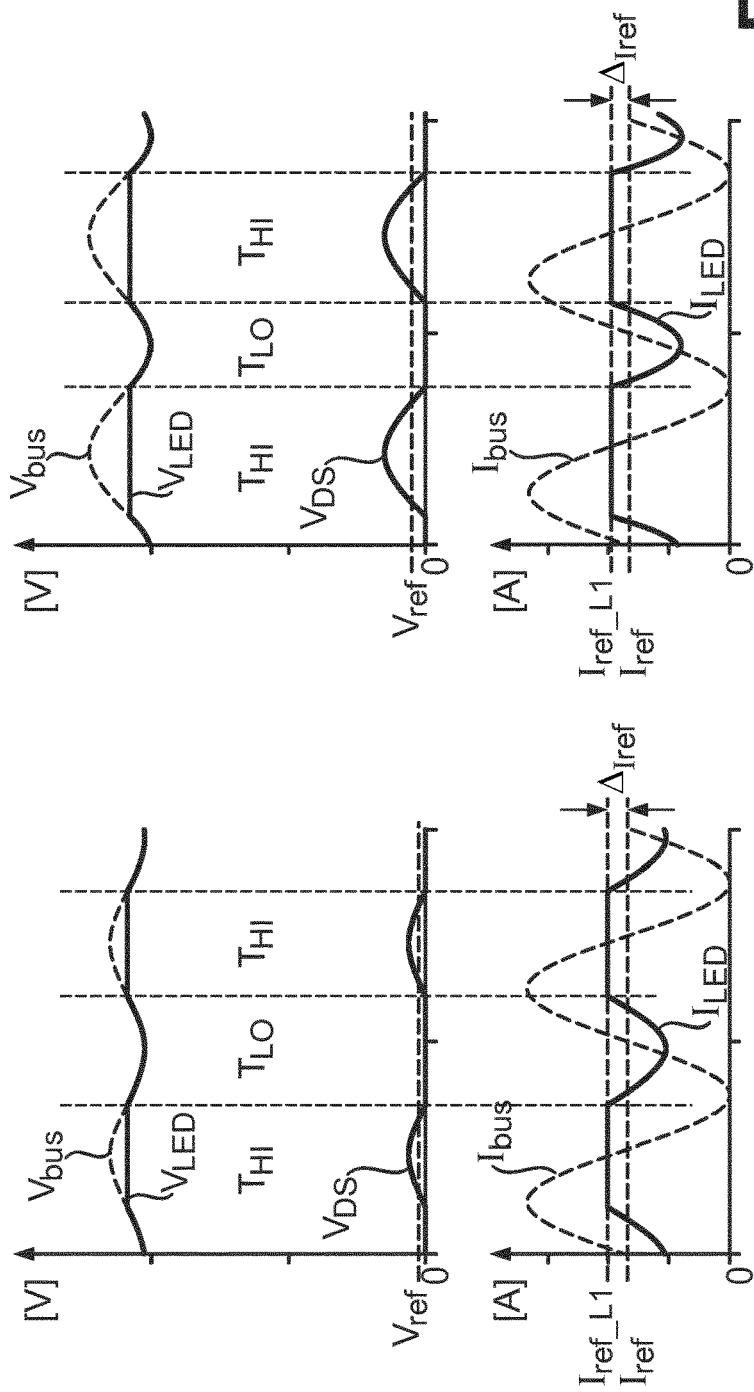
FIG. 5B shows exemplary waveforms for an LED lighting arrangement according to the invention during a "constant flicker" mode of operation.

The action of the linear post-regulation according to the invention is to adjust the LED current $I_{LED}$ so that losses of the post-regulator 1 are minimized (as explained in FIGS. 2 and 3), or to reduce flicker by achieving a smaller difference between high and low output current levels, i.e. by lowering the level of fluctuation on the LED current $I_{LED}$ (as described in FIG. 4). FIGS. 5A and 5B show voltage waveforms (upper part of the diagram in each case) and current waveforms (lower part of the diagram in each case) for the LED lighting arrangements 2 described above. FIG. 5A illustrates the operation of the post-regulator 1 in a "constant loss" mode, while FIG. 5B illustrates the "constant flicker" mode. The bus voltage $V_{bus}$ and bus current $I_{bus}$ of the driver 21 comprise a DC component and an essentially sinusoidal AC component. Each half mains period can be subdivided into two intervals or phases $T_{LO}$, $T_{HI}$.

In a first interval $T_{LO}$ the bus voltage $V_{bus}$ is "low", i.e. the half-wave of the sinusoidal bus voltage $V_{bus}$ is a trough. During this interval $T_{LO}$, the first control loop L1 applies a control signal $Q_{control}$ to the transistor Q so that the transistor Q is fully conducting and the voltage drop $V_{DS}$ across the transistor Q is essentially zero. During this interval $T_{LO}$, the resulting LED current $I_{LED}$ also exhibits a valley or trough, following the sinusoidal shape of the bus current $I_{bus}$.

In the second interval $T_{HI}$, the bus voltage $V_{bus}$ is "high", i.e. the half-wave of the sinusoidal bus voltage $V_{bus}$ is a peak. During this interval, the transistor Q is controlled in linear or constant current mode, i.e. as a controllable resistor, so that the LED current $I_{LED}$ remains at a constant level, and there is a non-zero voltage drop $V_{DS}$ across the transistor Q. During this interval $T_{HI}$, the resulting LED voltage $V_{LED}$ is constant.

The left-hand side of FIG. 5A shows a situation early on in the life of the lighting arrangement that is being operated in a "constant loss" mode. The buffer capacitor $C_{BUF}$ has its nominal value of 68 µF. The relative loss is determined to be 3%. At this stage, the flicker index is measured to be 6%. During the lifetime of the lighting arrangement, the capacitor deteriorates. The post regulator 1 according to the invention compensates for this according to the performance parameter input $V_{ref}$. This is shown in the right-hand side of FIG. 5A, illustrating a situation later on in the life of the lighting arrangement. The buffer capacitor $C_{BUF}$ has degraded to half its nominal value, i.e. to 34 µF. Owing to the inventive post-regulation, the relative loss is still a favourable 3%. The flicker index is now determined to be 17%. In other words, some increase in flicker is accepted in return for constant loss, since this reduces the energy consumption of the lighting arrangement towards the end of its life. Such an embodiment may be preferred in applications with a limited thermal budget, for which overheating is a significant issue and for which a slight increase in flicker may not be noticeable.

The left-hand side of FIG. 5B shows a situation early on in the life of the lighting arrangement that is being operated in a "constant flicker" mode. In this case also, the buffer capacitor $C_{BUF}$ has its nominal value of 68 µF. The relative loss is determined to be 2%. At this stage, the flicker index is measured to be 10%. When the lighting arrangement is being operated in "constant flicker" mode, the post regulator 1 according to the invention compensates for the deterioration of the buffer capacitor according to the performance parameter input $\Delta I_{ref}$. The right-hand side of FIG. 5B shows a situation later on in the life of the lighting arrangement. The buffer capacitor $C_{BUF}$ has degraded to half its nominal value, i.e. to 34 µF. Owing to the inventive post-regulation, the flicker index has remained essentially constant and is now 11%. The relative loss has increased to 5%. The other words, some increase in loss is accepted in return for constant flicker, in order to maintain the quality of the light output by the lighting arrangement towards the end of its life. Such an embodiment may be preferred in applications such as indoor lighting for home or office applications, in which the power consumption is relatively low in any case, and in which an increase in flicker would be noticeable to a user.

Figure 6:
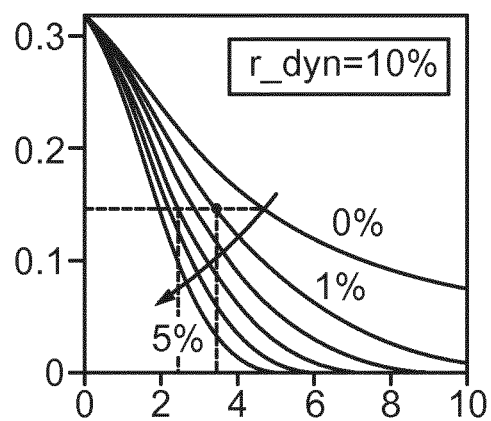
FIG. 6 shows graphs of relative post-regulator loss achievable by a linear post-regulator according to the invention.
Figure 6:
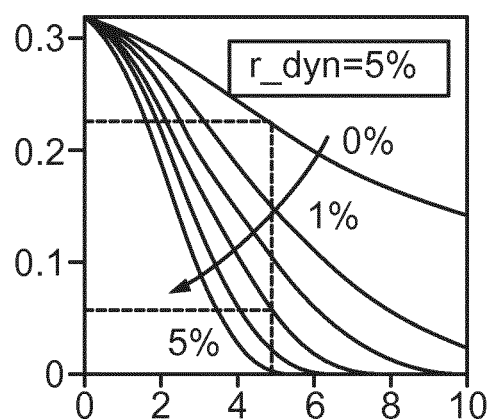

FIG. 6 shows graphs of relative post-regulator loss for different types of LEDs in terms of their relative dynamic resistance r_dyn [%] as made possible by the linear post-regulator according to the invention, for a unity power factor power converter. The relative dynamic resistance represents the resistive part of the total LED forward voltage. A relative dynamic resistance of 10% (left-hand side of the diagram) represents currently available mid-power LEDs, while a relative dynamic resistance of 5% (right-hand side of the diagram) represents currently available high-power LEDs. In future, the relative dynamic resistance of LEDs is expected to decrease further.

In each case, a family of curves is shown for relative loss of 0%, 1%, . . . , 5%. The relative loss may be defined as one hundred percent minus the efficiency (in percent) of the post-regulation. The Y-axis in each case represents the flicker index as defined by the IESNA, and is plotted against the relative size of the storage capacitor $C_{BUF}$ along the X-axis [%]. The capacitor size is normalized to the ideal value required for zero flicker, and represents the case of an ideal second stage. A curve for 0% relative loss represents the situation in which there is no post-regulation. The family of curves relates to various values of the reference voltage $V_{ref}$ with which the post-regulation losses can be controlled.

The characteristic curves show that the capacitor $C_{BUF}$ can be "shrunk" at a cost of only a few percent in relative post-regulation loss while maintaining the same value of flicker index. For the above mentioned example of a 25 W lamp with 100 V LED string, and for LEDs with a relative dynamic resistance r_dyn of 10%, a flicker index of 0.1 can be maintained when a buffer capacitor $C_{BUF}$ with a value of 39 µF is used instead of a capacitor $C_{BUF}$ with a value of 120 µF, with the effect of introducing the relative post-regulator loss of 5%. An advantage of the LED lighting arrangement according to the invention is that the post-regulator can be used to keep the flicker index constant, which is a significant improvement in view of the expected degradation of the storage capacitor $C_{BUF}$ over time. Instead of an increase of flicker towards the end of the lifetime (which would be the case if the arrangement were operated at constant loss) the "constant flicker" mode of operation allows a slight increase of post-regulation losses to counteract the effects of degrading capacitance of the buffer capacitor. Alternatively, the flicker index can be reduced significantly without increasing the size of the capacitor $C_{BUF}$. For example, for LEDs with a relative dynamic resistance r_dyn of 5%, the flicker index can be reduced from about 0.22 to about 0.17 for the same relative size of capacitor, but with an increase in relative post-regulation loss from 0% to 3%. In this case, depending on the LED droop, the average light output can be increased slightly as well. The reduction of flicker can also lead to a more efficient operation of the LEDs. This, together with the reduced size of the storage capacitor, the reduced flicker and the more predictable performance justify the extra losses.

Figure 7:
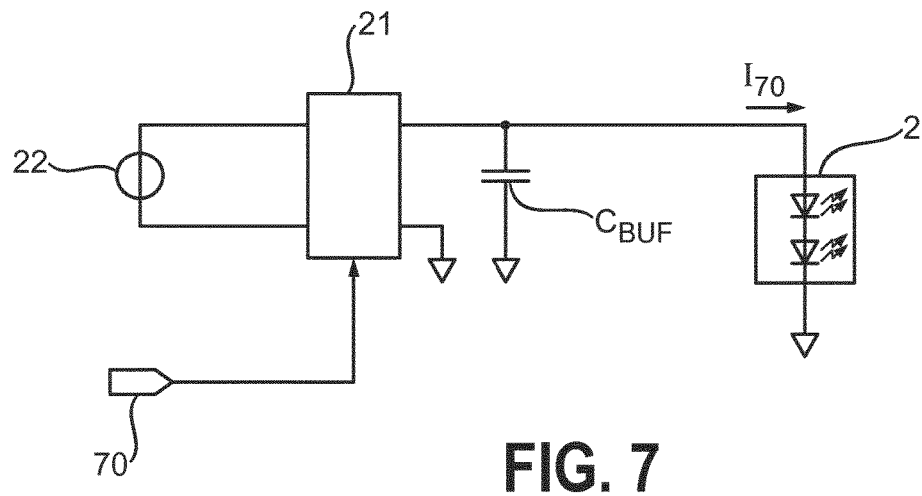
FIG. 7 shows a prior art driver for driving an LED arrangement.

FIG. 7 shows a prior art realization in which a single-stage driver 21 is used to drive an LED arrangement 20. Here also, the power converter 21 controls the average LED current $I_{70}$ on the basis of an input current reference 70. As explained in the introduction, such a single-stage power conversion architecture may be preferred for cost reasons to drive an LED arrangement 20, even if the converter 21 must operate at a high power factor. This results in a high ripple component on the LED current $I_{70}$, and this ripple also has a negative effect on the luminous efficiency of the LEDs. The undesirable ripple component cannot be reliably counteracted by the storage capacitor $C_{BUF}$ in parallel with the LED arrangement 20 because of size limitations, unavoidable degradation of the capacitance, and uncertainties regarding the dynamic resistance of the LED arrangement.

Figure 8:
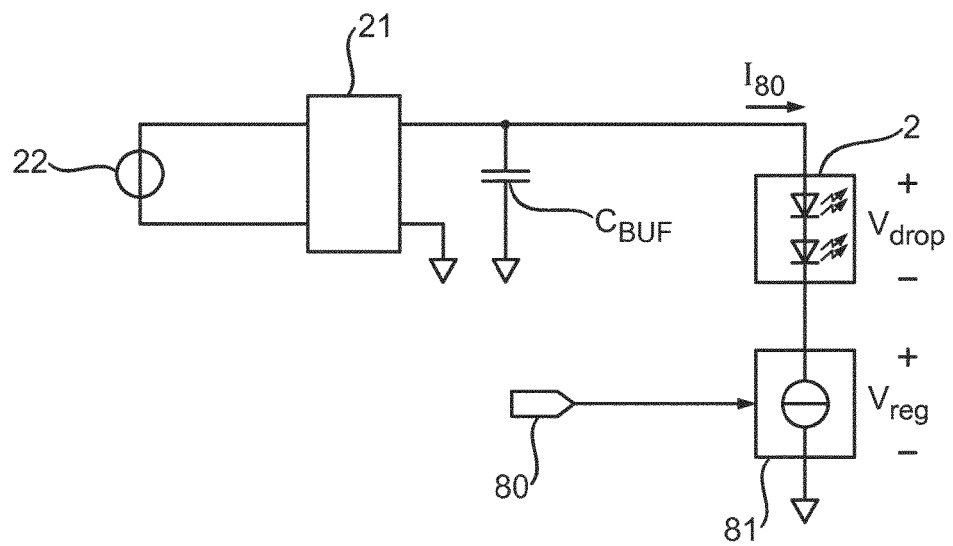
FIG. 8 shows a further prior art driver for driving an LED arrangement.

FIG. 8 shows another prior art realization in which the circuit of FIG. 7 has been augmented by a linear post regulator 81, whose purpose is to control the LED current $I_{80}$ while the power converter 21 controls the supply voltage to the LED arrangement 20. The voltage drop across the LEDs is indicated by the value $V_{drop}$, while the voltage drop across the linear post regulator 81 is indicated by the value $V_{reg}$.

The linear post regulator 81 receives a current reference signal 80 and regulates the LED current $I_{80}$ by adjusting the resistance presented by the transistor of the linear post regulator 81. Generally, the transistor forms a controllable resistance with a value given by $V_{reg}/I_{80}$. However, the known types of linear post regulator 81 are characterized by relatively high losses, on account of the power dissipated by the transistor, namely $I_{80} \cdot V_{reg}$. Since the output voltage of the power converter is fixed, it has to be designed to be always larger than $V_{drop}$. Thus any tolerances of $V_{drop}$ due to temperature variations, binning, aging etc. result in an increase of $V_{reg}$ and therefore an increase in losses.

Although the present invention has been disclosed in the form of preferred embodiments and variations thereon, it will be understood that numerous additional modifications and variations could be made thereto without departing from the scope of the invention. For example, as indicated above, the post-regulator could be arranged between the power converter and the LED arrangement such that the post-regulator is connected to an anode of the LED arrangement.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A linear post-regulator realized for use in an LED lighting arrangement, which linear post-regulator comprises
   a control loop cascade realized for connection between a terminal of an LED lighting load and a power converter of the LED lighting arrangement;
   a transistor (Q) realized to regulate an LED current ($I_{LED}$) through the LED lighting load;
   a first input (11) for connection to a reference current ($I_{ref}$);
   a second input for connection to a reference current ripple ($V_{ref}$, ΔIref); and
   an output for connecting a power control output (Pctr) of the linear post-regulator to the power converter;
   wherein the control loop cascade comprises at least two interconnected control loops to regulate the LED current ($I_{LED}$) on the basis of the reference current input ($I_{ref}$) and to adjust current ripple of the LED lighting arrangement on the basis of the reference current ripple ($V_{ref}$, $\Delta I_{ref}$).

2. A linear post-regulator according to claim 1, wherein the reference current ripple input ($V_{ref}$, ΔIref) comprises a reference voltage ($V_{ref}$), and wherein the control loop cascade is realized to adjust an output voltage ($V_{bus}$) of the power converter on the basis of the reference voltage ($V_{ref}$).

3. A linear post-regulator according to claim 1, comprising a first control loop realized to provide a control signal ($Q_{control}$) to the transistor (Q).

4. A linear post-regulator according to claim 3, wherein the control signal ($Q_{control}$) is generated on the basis of the first loop reference current ($I_{ref\_L1}$) provided by the second control loop.

5. A linear post-regulator according to claim 1, comprising a second control loop realized to generate a first loop reference current ($I_{ref\_L1}$) on the basis of the reference current input ($I_{ref}$) and a current through the transistor (Q).

6. A linear post-regulator according to claim 1, comprising a third control loop realized to provide a power control output ($P_{ctr}$) to the converter on the basis of the reference current ripple input ($V_{ref}$, ΔIref) and a voltage ($V_{PR}$) across the post-regulator.

7. A linear post-regulator according to claim 1, wherein the transistor (Q) comprises a MOSFET, preferably an n-channel depletion-mode MOSFET.

8. A linear post-regulator according to claim 1, wherein a control loop comprises a number of operational amplifiers.

9. An LED lighting arrangement comprising
a single-stage power converter for connection to a power supply;
an LED lighting load comprising a number of LEDs;
a linear post-regulator according to claim 1 connected between a terminal of the LED lighting load and a terminal of the power converter; and
an input means for providing a reference current input ($I_{ref}$) and a reference current ripple input ($V_{ref}$, $\Delta$Iref) to the linear post-regulator.

10. An LED lighting arrangement according to claim 9, wherein the power converter comprises a switched-mode power converter with power factor correction.

11. An LED lighting arrangement according to claim 10, wherein an input means is connected to a local signal source within the LED lighting arrangement and/or an input means is connected to a remote signal source.

12. A method of post-regulating the current of an LED lighting load of an LED lighting arrangement, which method comprises the steps of
providing a post-regulator (1) comprising a control loop cascade of at least two interconnected control loops for connection between a terminal of the LED lighting load and a power converter of the LED lighting arrangement, and a transistor (Q) to regulate an LED current ($I_{LED}$) through the LED lighting load;
providing to the post-regulator a first input for connection to a reference current input ($I_{ref}$); and
providing to the post-regulator a second input for connection to a reference current ripple input ($V_{ref}$, $\Delta$Iref);
applying the control loop cascade to regulate the LED current ($I_{LED}$) on the basis of the reference current input ($I_{ref}$) and to adjust current ripple of the LED lighting arrangement on the basis of the reference current ripple input ($V_{ref}$, $\Delta$Iref).

13. A method according to claim 12, wherein regulation losses of the post-regulator are controlled on the basis of the power control output ($P_{ctr}$) from a control loop of the control loop cascade when the reference current ripple input ($V_{ref}$) comprises a reference voltage input ($V_{ref}$).

* * * * *